United States Patent Office 3,305,193
Patented Feb. 21, 1967

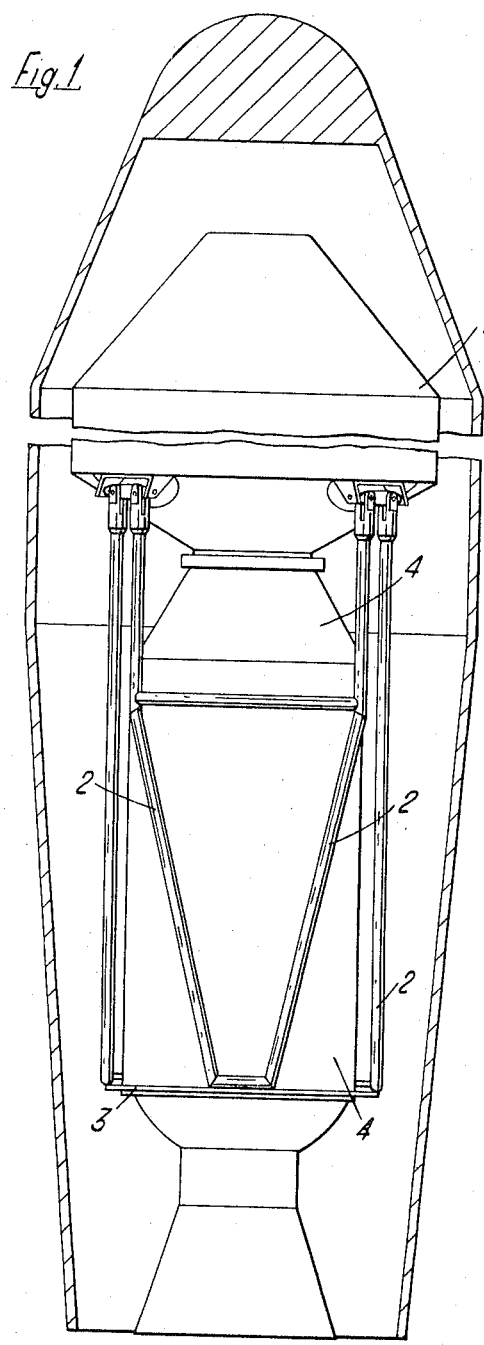

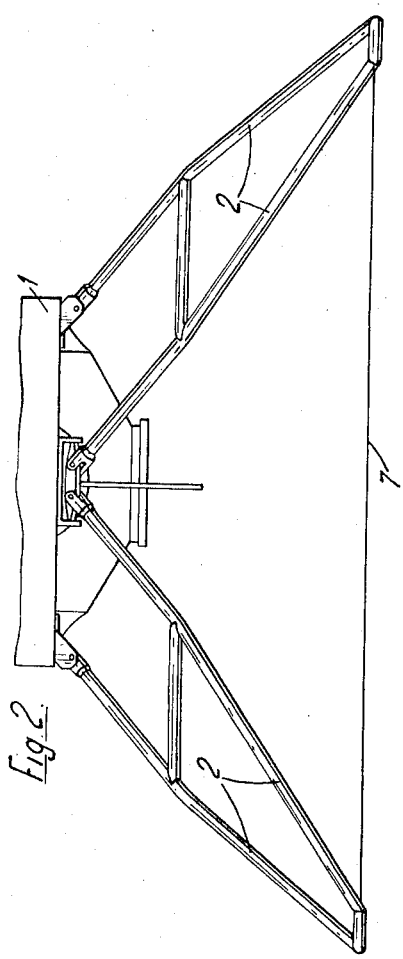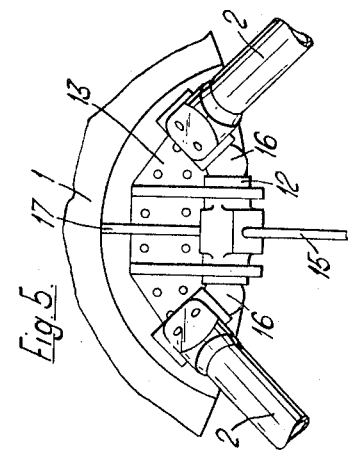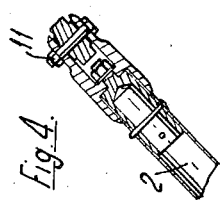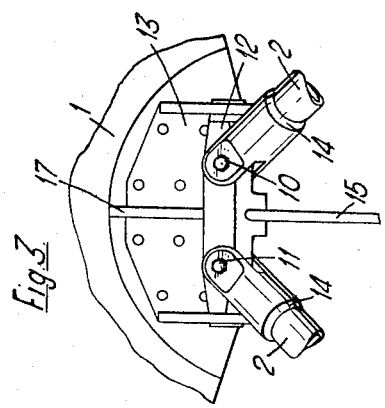

3,305,193
SPACECRAFT BOOM ERECTION APPARATUS
Jacob Lewis Blonstein, Harpenden, and Stanley William Sherman, Stevenage, England, assignors to British Aircraft Corporation (Operating) Limited, London, England, a British company
Filed Mar. 23, 1964, Ser. No. 353,934
Claims priority, application Great Britain, Mar. 29, 1963, 12,600/63
4 Claims. (Cl. 244—1)

Spacecraft frequently carry scientific equipment that must be kept clear of the body of the craft and it is common practice to erect booms for supporting such equipment after the craft has been ejected from the launching rocket. Before ejection the booms are folded to save room inside the rocket. It is customary to provide three or four such booms, although any number may be required, and it is usually essential that all of them erect simultaneously and symmetrically so that the spacecraft body, which is usually biven a spinning motion for stabilization and scanning purposes, is not subjected to asymmetrical forces which would upset its stability and result in irregularities in data output.

In the past symmetrical erection has usually been achieved by coupling the booms together through special linkages or cables, which leads to a somewhat complicated construction and is therefore prone to failure.

According to the present invention, each of a number of booms arranged in sequence around the body of the craft has means pivotally connecting it to the said body, the pivotally connecting means for each pair of adjacent booms being interconnected so that the erection of any one boom automatically causes the simultaneous erection of the remaining booms in the sequence. The booms may each have two arms, each of which shares a common hinged mount with an arm of an adjacent boom. This arrangement avoids the use of components additional to the booms and boom hinges themselves and yet ensure symmetry and simultaneity of erection.

Preferably damping means are provided to prevent excessive loads being transmitted to the boom hinges and mountings when the booms are first erected.

In spacecraft which are spun for stabilization and scanning purposes, the centrifugal force acting on the booms may be sufficient to erect them, all booms being subjected to substantially identical erection forces and the loads transmitted to the mountings being limited to those forces resulting from slight differences in boom mass or centre of gravity positions. If the spacecraft is not spinning, it is sufficient in the present arrangement to provide erecting means for one boom only since all the other booms will follow its motion symmetrically, Similarly, the locking of all the booms in their erected positions is ensured by the provision of only a single lock on one boom.

In addition to the equipment carried by the booms themselves further devices such as telemetry aerials can be mounted on the hinged mountings of the booms so that they are erected simultaneously with the booms themselves.

A particular example of a satellite embodying the present invention having four booms hinged to its body will be described by way of example with reference to the accompanying drawings, in which:

FIGURE 1 shows the satellite within the body of a launching rocket with its booms in a folded position;

FIGURE 2 is a side view of part of the satellite showing two of the booms in their erected position; and FIGURES 3, 4 and 5 are enlarged views showing details of two arrangements for mounting the booms on to the satellite body.

FIGURE 1 shows a satellite 1 with its booms 2 folded down and tied by means of a tie strap 3 to the final stage motor 4 of a launch rocket. After ejection from the launch rocket the boom tie-strap 3 is explosively released. Before release of the booms, the satellite 1 will have been given a spinning motion and the consequent centrifugal force on the booms 2 causes them to become erected and to take up the position shown in FIGURE 2. When the booms have reached their required position they come into contact with stops and detent locks operate. In order to prevent excessive loads being transmitted to the hinges when the booms hit their stops a simple damper in the form of a cable 7 (FIGURE 2) stretched between the tips of two adjacent booms is provided. The length, material and diameter of the cable 7 is chosen so that it pulls taut, just before completion of erection, and is then stretched until the booms touch their stops and the detent lock operates. The stretching of the cable absorbs energy during the last stages of the erection and slows the booms in their final movement. In the closed position of the booms, the cable runs up one boom arm and down the next. If desired, for symmetry, cables may be stretched between the tips of two pairs of booms. After boom erection, the satellite is separated from the final stage motor by the evplosive release of a clamp which normally maintains in position a ring connecting the satellite and motor. A spring interposed between the satellite and motor pushes them apart when the clamp is released.

FIGURES 3 and 4 show details of a first hinge mounting by means of which the booms 2 may be mounted on the satellite body. The arms of two adjacent booms 2 are pivoted at 10 and 11 respectively to the movable portion or trunnion block 12 of a hinge mounting the fixed portion 13 of which is rigidly attached to the body of the satellite 1. As can be seen more clearly from the axial section in FIGURE 4, in this arrangement the boom itself includes a rotating joint 14 having a bush of polyeterafluoroethylene. Thus as the block 12 pivots to erect the booms, the booms will also swivel about their mounting pins 11 to permit simultaneous separation of the extreme ends of the booms and at the same time the booms will rotate in the rotating joints 14 as necessitated by the fact that the two legs of each boom are connected to different hinges which are set at an angle to one another. Locking of the booms may be accomplished by spring-loaded pins mounted on the satellite structure. When a boom is in its fully erected position the spring loading causes the pin to enter a hole in the boom and thus to lock it.

As shown in FIGURE 3 a telemetry aerial 15 may be connected to the block 12 so that it is erected at the same time as the booms are erected. A coaxial cable 17 connects the aerial to apparatus in the body of the satellite.

FIGURE 5 shows an alternative mounting arrangement to that shown in FIGURES 3 and 4 in which the booms 2 themselves have no movable joints, corresponding to the rotating joint 14 in the arrangement shown in FIGURES 3 and 4. Instead they are mounted on the movable portion 12 of the hinge bracket attached to the body of the satellite through universal joints 16 which allow the booms 2 to rotate relative to their mountings.

In the example described above, at least one pair of adjacent boom tips are joined by a thin wire 7 which is stretched as the booms separate. If desired, the wire 7 can be replaced by a stronger cable to stop the boom movement and a damping wire connected in parallel with the cable so that as the cable is straightened during the final erection movement of the booms, the thin parallel wire is stretched and absorbs energy and provides additional damping. With such an arrangement, the triangle formed by the taut cable and two arms of the two adjacent booms can be utilised as a loop aerial for radio purposes.

In the example described above, the satellite is given its spinning motion by four small rocket motors arranged around the tail of the motor 4. In the case in which the body to which the booms are atached is not spinning it is necessary to provide an actuator for erecting at least one of the booms and in this case damping arrangements reducing the strain on the hinges can be built into the actuator itself, if desired. The actuator may take the form of a coiled spring anchored at one end to the satellite body and so arranged that on unwinding it rotates a boom pivot so as to erect the boom.

Although the constructions described above are the preferred methods of connecting the booms to the satellite body, it is also possible to avoid the rotational hinges at 10 and 11 by replacing the trunnions by pairs of mating bevel gears. Thus the adjacent arms of two adjacent booms may be rigidly mounted on shafts which are at right-angles to one another and which carry the bevel gears at their adjacent ends.

The boom shape is independent of the erection mechanism and is determined by the instruments which the booms are required to support and by symmetry. For example, an array of solar cells for the generation of electrical power from sunlight can be supported by booms mounted on a satellite body and the booms may be caused to assume upon erection any desired angle with respect to the body of the satellite so that the array of solar cells faces in the optimum direction.

We claim:
1. A spacecraft having a body portion and a number of booms arranged in sequence around the body portion, each boom having two arms which meet the body portion at points angularly spaced with respect to the axis of the body portion, which points are respectively adjacent to the points at which the arms of the two adjacent booms meet the body portion, and a common hinged mount for each pair of adjacent boom arms of different booms, the common hinged mount pivotally interconnecting the adjacent boom arms to the said body portion so that the erection of any one boom automatically causes the simultaneous erection of the remaining booms.

2. A spacecraft according to claim 1, in which each boom arm contains a rotating joint permitting rotation of the boom arm about its longitudinal axis.

3. A spacecraft according to claim 1, in which each boom arm is connected to its hinged mount through a universal joint.

4. A spacecraft according to claim 1 including a wire connected between two adjacent booms so that it is stretched when the booms are erected, to provide damping in the final stage of erection.

References Cited by the Examiner
UNITED STATES PATENTS

| | | | |
|---|---|---|---|
| 2,683,574 | 7/1954 | Peterson | 244—46 |
| 2,978,211 | 4/1961 | Wannlund et al. | 244—138 |
| 3,047,259 | 7/1962 | Tattnall et al. | 244—1 |
| 3,054,584 | 9/1962 | Andras | 244—1 |

FERGUS S. MIDDLETON, *Primary Examiner.*